United States Patent

[11] 3,628,495

| [72] | Inventor | Leo Hagedorn |
| | | Wuppertal-Elberfeld, Germany |
| [21] | Appl. No. | 712,043 |
| [22] | Filed | Mar. 11, 1968 |
| [45] | Patented | Dec. 21, 1971 |
| [73] | Assignee | Maschinenfabrik Carl Zangs |
| | | Aktiengesellschaft |
| | | Krefeld, Germany |
| [32] | Priority | Mar. 13, 1967 |
| [33] | | Great Britain |
| [31] | | 11,591/67 |

[54] INDICATING DEVICES
4 Claims, 10 Drawing Figs.

[52] U.S. Cl. ........................................ 116/115.5,
33/166
[51] Int. Cl. ........................................ B23q 17/00
[50] Field of Search .......................... 116/129,
133, 115, 115.5; 33/166

[56] References Cited
UNITED STATES PATENTS

| 1,027,549 | 5/1912 | Kronert | 33/146 |
| 1,444,565 | 2/1923 | Smith | 33/146 |
| 2,753,834 | 7/1956 | Bourguignon | 116/115 |
| 3,160,137 | 12/1964 | Simon | 116/115 |
| 3,418,965 | 12/1968 | Rabinow | 116/115.5 |
| R26,527 | 2/1969 | Rabinow | 116/115.5 |

FOREIGN PATENTS

| 112,213 | 10/1962 | Pakistan | 116/115 |

Primary Examiner—Louis J. Capozi
Attorney—Watson, Cole, Grindle & Watson

ABSTRACT: An indicating device for giving metric measurements with a feed screw of inch fractional pitch or vice versa comprises a handwheel for the screw, an index scale and a gear drive, preferably epicyclic, between the handwheel and scale. The ratio of the gear drive provides the conversion. There may be another index scale and another gear drive, the second scale indicating feed in the same measurement system as the screw. Either indicating system may have a supplementary geared scale so that there is a coarse and fine scale for that system. There may be a fine metric scale, a fine inch scale and a combined coarse inch and metric scale, driven by three respective epicyclic gears. One member of each epicyclic gear, normally stationary, may be movable after release of a brake for zero adjustment. The gearing and scales may be within a windowed casing fastenable to a machine, the hand wheel being external to the casing.

INVENTOR
Leo Hagedorn

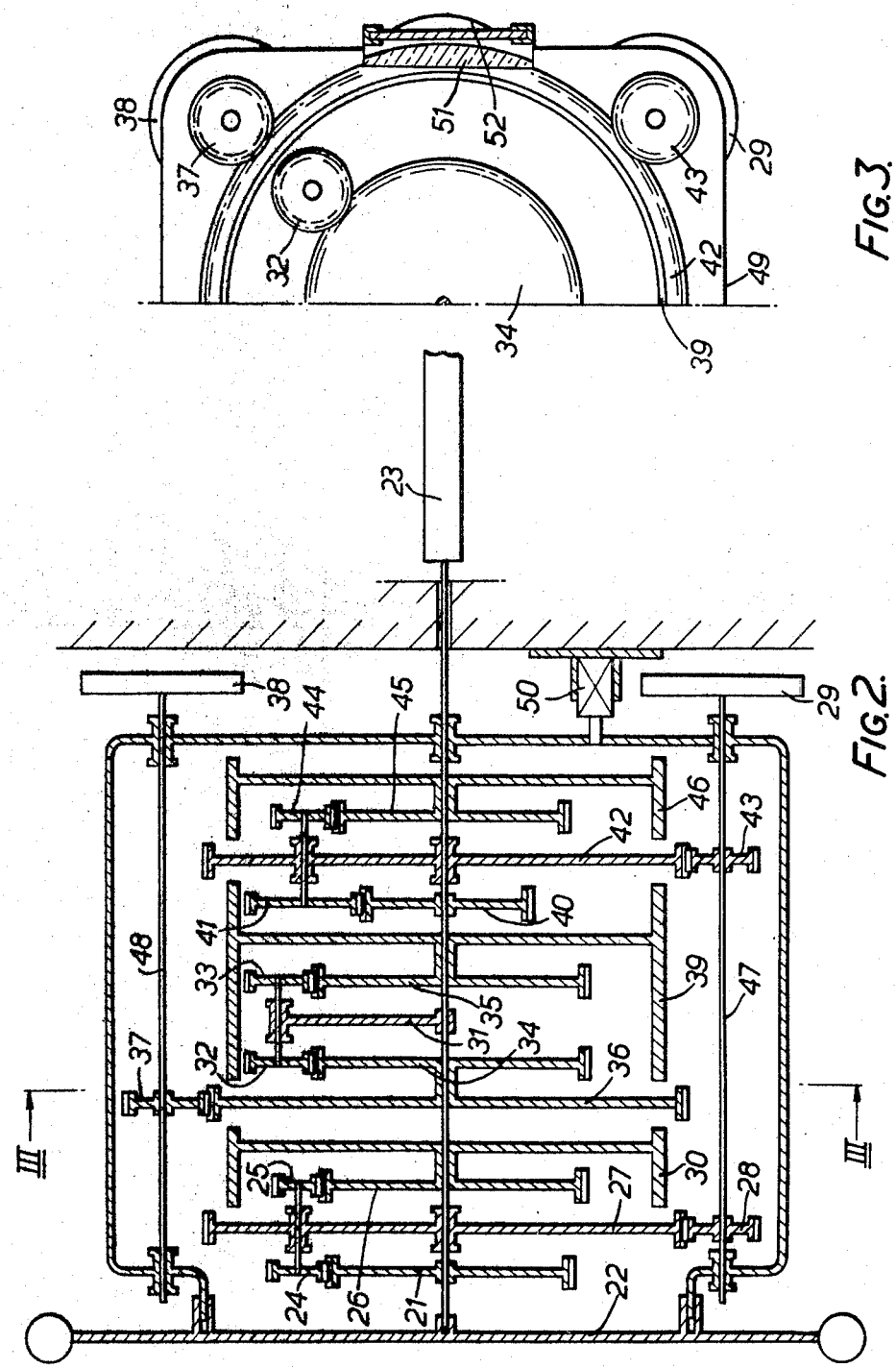

INVENTOR
Leo Hagedorn
BY
Watson, Cole, Grindle & Watson
ATTORNEYS

INDICATING DEVICES

The present invention relates to indicating devices for indicating the movements resulting from rotation of feed screws on machines such as machine tools.

It is a common practice to equip the handwheel (which term includes a handcrank or other similar device) by which such a screw or its nut is rotated with an index scale in the form of a disc or drum having its periphery divided into some convenient number of divisions, say 100 or with a screw of ⅛-inch pitch, 125 and such scales have been rotatable and lockable in relation to the handwheel to provide a zero adjustment. Such a device gives no indication however of the number of whole revolutions of the screw and hence of the total feed movement. This has been provided in a known handwheel by equipping it with a second index scale geared (suitably by epicyclic gearing) to the handwheel to rotate at a fraction of the speed of the wheel and having its periphery divided to indicate whole revolutions of the handwheel. With a suitable gear ratio one revolution or preferably somewhat less than one revolution of the second scale will indicate the total length of feed available.

It is also a well known practice to equip a lathe tailstock with an index scale in the form of a disc on the handwheel hub which subdivides one revolution of the handwheel and with a length scale marked on the barrel and cooperating with an index on the tailstock body (or an index carried by the barrel cooperating with a length scale on the body) by which total revolutions can be read off.

Such arrangements are only suitable for making feed movements in terms of the system of measurement in which the thread of the screw is expressed. However, in industry various measuring systems are employed for the same dimensions. The best known are the metric system and the inch system which are used side-by-side. The necessity often arises moreover to effect movements, the dimensions of which are stated according to one system on a machine in which the feed screw pitch is in accordance with the other system, for example, to make movements according to inch dimensions with a metric feed screw and vice versa.

One object of the present invention is to provide indicating means which for a feed screw with a pitch according to one system of measurement will give indications according to another system. To achieve this the handwheel is equipped with a gear (suitably epicyclic gear) driven index scale driven at such a ratio that its divisions indicate feed movements in units or fractions of units of the other system. The only limitation is that the two systems must be related in a ratio which can be expressed as the ratio of integers. This presents no difficulty in the case of the two main systems above referred to since according to both British standards and German standards an inch is specified as being equal to 25.4 millimeters.

This device can be supplemented with a second scale geared suitable by epicyclic gearing to the first scale to indicate not fractions of a whole revolution of the handwheel, but fractions of the feed movement represented by one division of the first scale.

In the above schemes the scales will be concentric with the handwheel and spindle and the gearing and scales may be enclosed in a casing equipped with a window and stationary index mark. The whole may be arranged so that the handwheel hub can simply be keyed to the screw spindle while the casing is anchored to a stationary part of the machine similarly to the embodiments described below, and an example is illustrated in the accompanying FIGS. 8, 9 and 10.

A development of the invention provides indicating means which for a particular feed screw will give indications according to more than one system of measurement. To this end according to the invention the indicating device comprises a separate rotating index scale for each system, all the scales being positively driven from a common shaft each through gearing corresponding to the pitch of the feed screw and the divisions of the scale so that each scale indicates according to its particular measurement system. This enables each index to be divided into a convenient number of parts around its periphery and in particular to avoid divisions which over the complete circle contain a fractional interval.

As before the only limitation is that the several systems of measurement must be related in ratios which can be expressed as the ratios of integers.

A further development consists in providing a pair of indicating members for each system, one giving a coarse measurement and the other a fine measurement. The two indicating members in each case are positively driven at a relative ratio of speed corresponding with the divisions employed.

Suitably epicyclic gearing is used and the indicating members are arranged so that zero adjustment can be made.

The invention will be further described with reference to the accompanying drawings in which:

FIG. 2 is a similar view of FIG. 1 but of an embodiment in which there is a fine scale and a coarse scale for each of the two systems.

FIG. 3 is a half section of FIG. 2 on the line III—III shown in FIG. 2.

Figure 1:
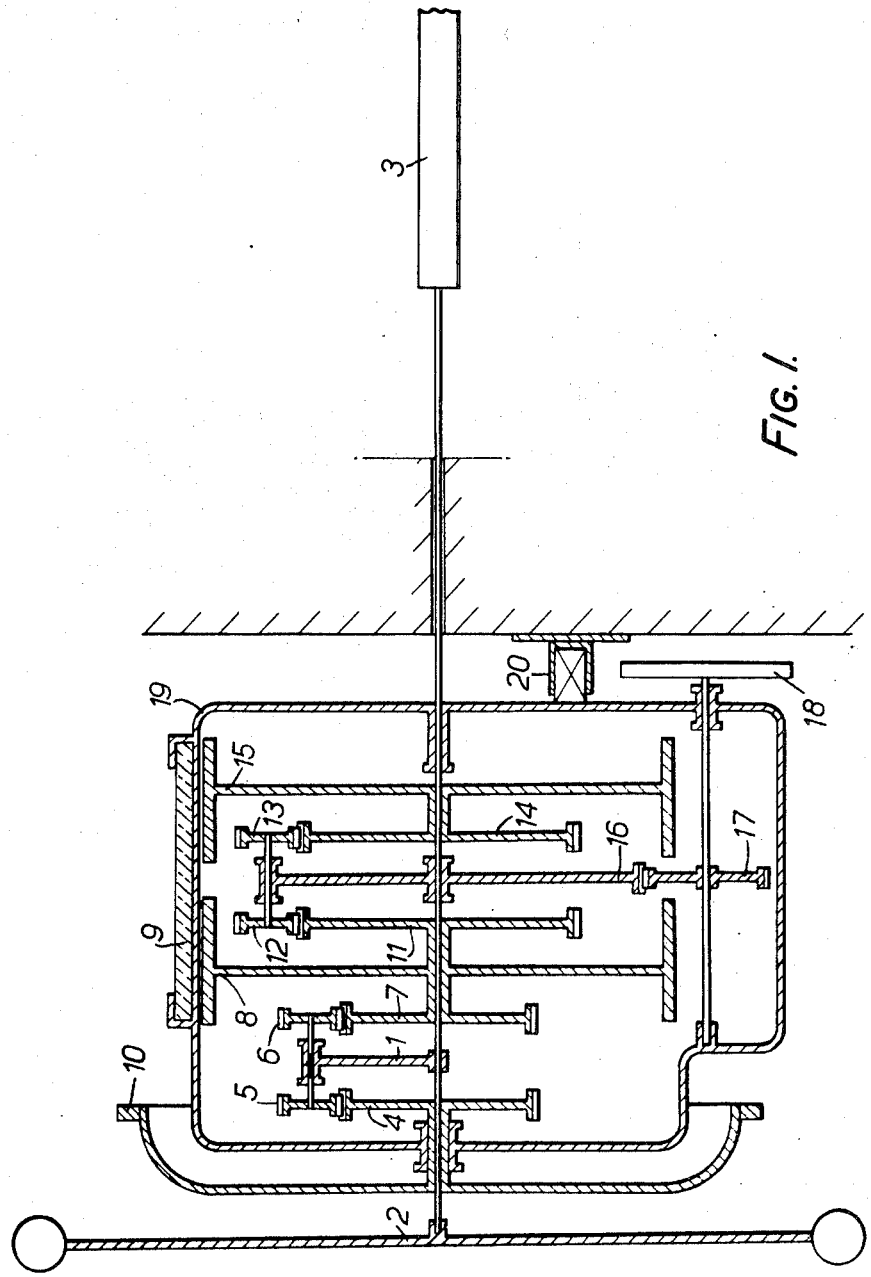
FIG. 1 is a diagrammatic section of an embodiment giving indications according to both inch and metric measurements from a single feed screw having thread according to one of these systems and a single index scale for each system.
Figure 4:
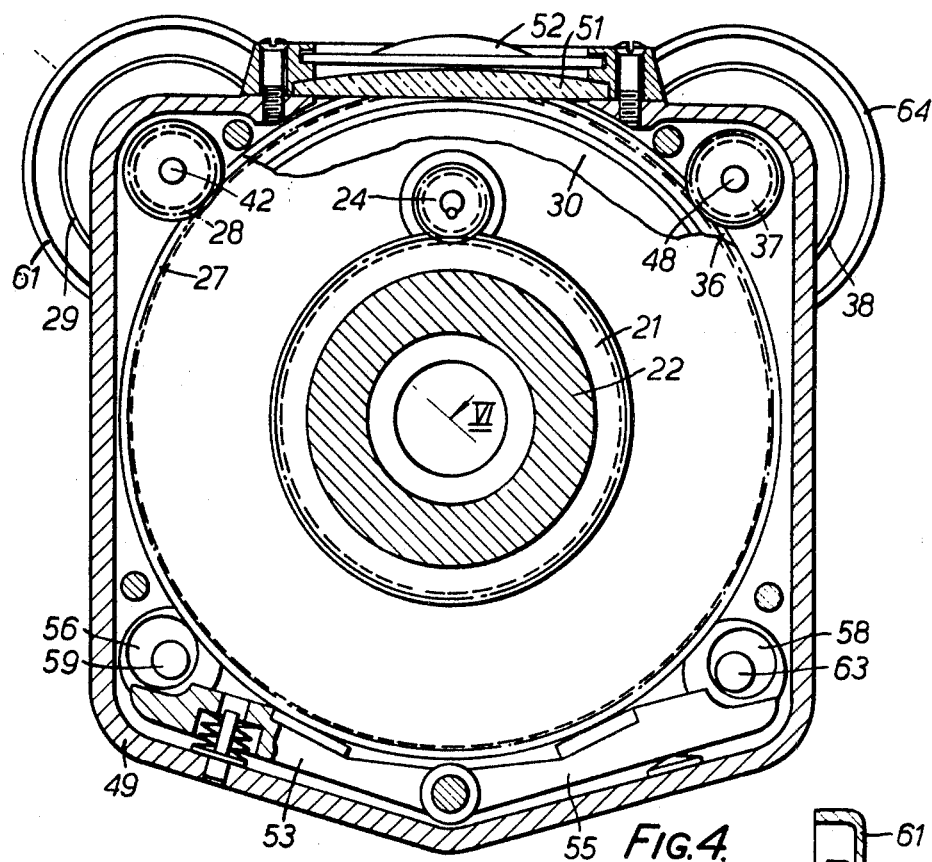
FIG. 4 is a midplane transverse cross section of an embodiment corresponding to the diagrammatic representation of FIGS. 2 and 3.
Figure 6:
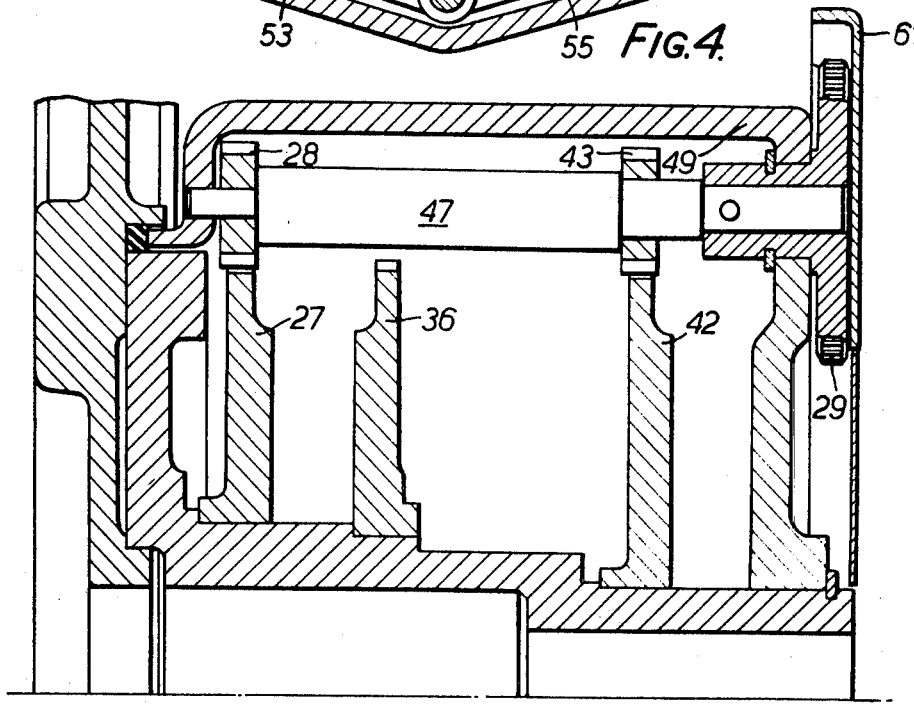
FIG. 6 is a longitudinal section on the line VI—VI of FIG. 4.
Figure 5:
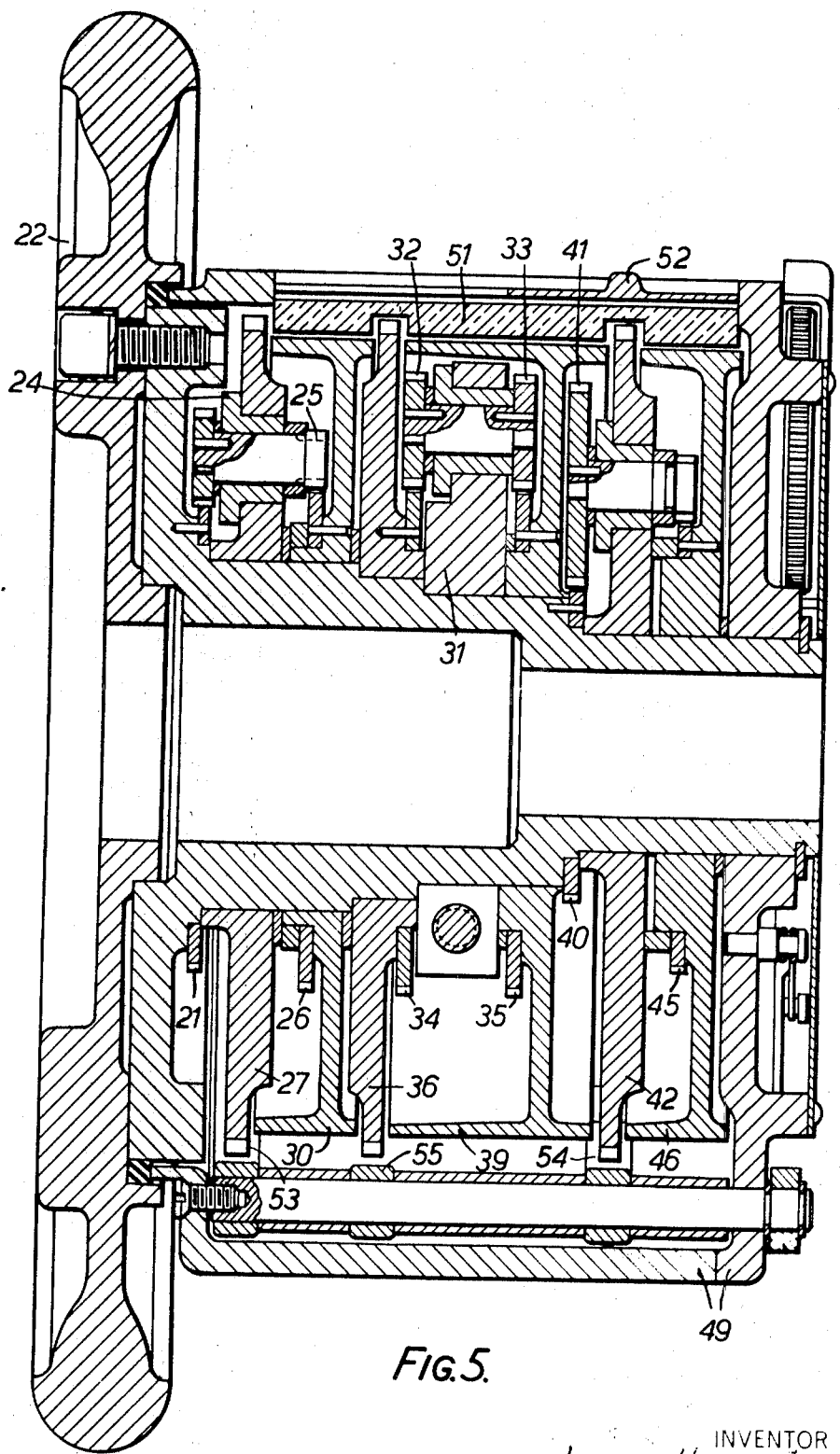
FIG. 5 is a midplane longitudinal section of the embodiment shown in FIG. 4 but on a larger scale.
Figure 7:
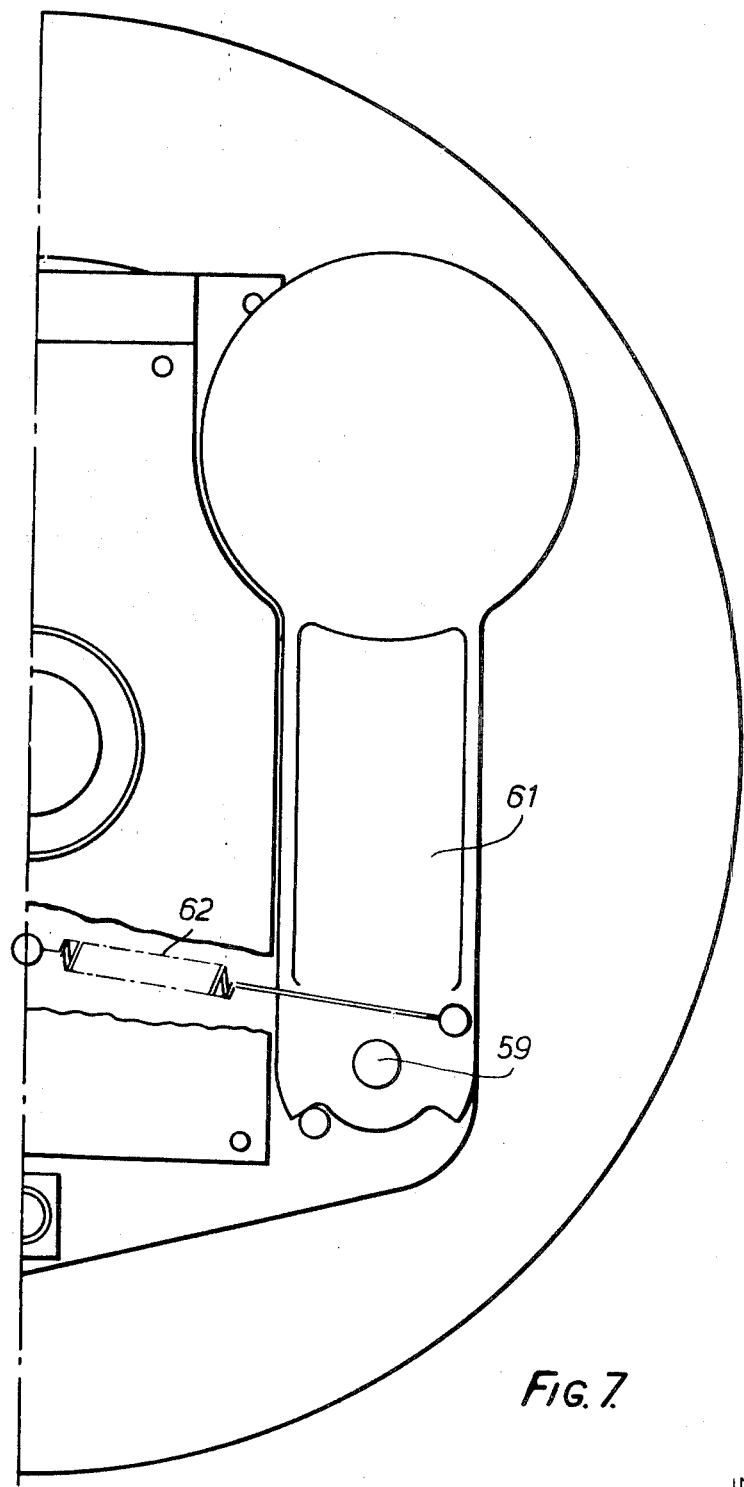
FIG. 7 is a detail rear view of the embodiment of FIG. 4 on the same scale as used in FIG. 5.

Referring to FIG. 1 a planet carrier 1 of an epicyclic gear is fast to the hub of a handwheel 2 which serves by direct coupling to drive a screw spindle 3 which is a feed spindle of a machine such as a machine tool. The carrier 1 has a bearing for planet wheels 5 and 6 coupled together which mesh respectively with sun wheels 4 and 7. The sun wheel 7 is fast to a cylindrical drum 8 having scale divisions on its periphery. The sun wheel 4 is fast through its hub with an external ring 10. This ring and thus the wheel 4 can be adjusted by hand and then be fixed by some locking means not shown. The ratio of the epicyclic train consisting of the wheels 4, 5, 6 and 7 is made such that the drum 8 rotates only through a few degrees for each revolution of the spindle 3, for example, with the same number of teeth on the wheels 5 and 6 and for example 95 teeth on the wheel 4 and 96 teeth on the wheel 7; the drum 8 will make one revolution for 96 revolutions of the spindle 3. If the spindle has a pitch of 0.25 inch for a feed movement of one inch, four revolutions are necessary. The drum 8 then for 360° represents a feed movement of 24 inches and is engraved accordingly. It makes one revolution for 96 revolutions of the spindle 3, that is, for a movement of 24 inches.

With the hub of the drum 8 is fast another sun wheel 11 which through planet wheels 12 and 13 drives a sun wheel 14 and the planet wheels 12 and 13 are journaled in a carrier constructed as a toothed wheel 16. This toothed wheel 16 can be adjusted by means of a toothed wheel 17 and a handknob 18. After adjustment the carrier wheel 16 can be locked in some manner not shown. The sun wheel 14 is fast with a scale drum 15 which is coaxial with the drum 8 and of the same diameter. The overall ratio of the wheels 11, 12, 13 and 14 is so chosen that scale divisions on its periphery indicate millimeters of feed movement, that is, for example 360° embracing 600 mm. The ratios are calculated on the basis that 127 mm. equals 5 inches corresponding with the British standard specification and the German standard specification.

All the rotating parts are enclosed in a casing 19 which can be secured to a wall of the machine by a coupling 20 which prevents rotation. At the top the casing 19 has a window 9 which by means of an index line enables the values indicated by the two scales to be read. The ring 10 and the knob 18 are outside the casing and enable either scale to be brought to zero at any time, thus any desired movement can be started from zero at any position of the machine.

In this embodiment accuracy of indication is limited by the fact that the total periphery of each of the two drums corresponds to a predetermined total feed movement. Substantially greater accuracy of indication is possible if each of the two measuring systems is provided with two scale drums, a coarse scale and a fine scale. The function of the coarse scale in each case is the same as that in the above example. The fine scale additionally subdivides each interval of the coarse scale. A embodiment of such an arrangement is shown in FIGS. 2 and 3.

In these figures a toothed wheel 21 is fast to the hub of the handwheel 22 and thereby to the screw spindle 23 at the machine. The rotation of the wheel 21 is transmitted through the toothed wheels 24, 25 to the toothed wheel 26. The wheels 21, 24, 25 and 26 form an epicyclic gear, the planet wheels 24 and 25 of which are journaled in a carrier 27 constructed as a toothed wheel. This wheel can be adjusted through a wheel 28 and handknob 29. The rotation of the wheel 26 is directly transmitted to a scale drum 30, the wheel 26 being fast on the hub of this drum.

The carrier 31 of a second epicyclic gear is also fast to the hub of the handwheel. This carries the bearing for planet wheels 32, 33 which mesh with further sun wheels 34 and 35. The sun wheel 34 through its hub is fast to a toothed wheel 36 which can be adjusted through a toothed wheel 37 and a handknob 38. The sun wheel 35 is secured to the hub of a scale drum 39 so that this drum shares the rotation of the sun wheel 35.

A toothed wheel 40 also fast to the handwheel hub drives a planet wheel 41 of a third epicyclic gear. The carrier of this gear is again constructed as a toothed wheel 42 which can be adjusted through a toothed wheel 43 and the handknob 29 already mentioned. Rotation of the planet wheel 41 is transmitted through another planet wheel 44 on the same spindle to a sun wheel 45. This sun wheel 45 is fast to the hub of a scale drum 46.

The three epicyclic gears referred to together with the three scale drums 30, 39 and 46 driven through them are arranged coaxially on the hub or shaft of the handwheel 22. The shafts 47 and 48 rotated by the handknobs 29 and 38 are journaled in a casing 49. This casing 49 which encloses all the scales and wheels is centered on the handwheel shaft but does not share in its rotation as it is prevented from rotating by a coupling 50. The scale drums 30, 39 and 46 have respective scales engraved on their peripheries which can be read through a window 51 with reference to an index mark not here shown. For the example above mentioned of simultaneous indication in the inch system and in the metric system the scale drum 39 has two separate scales with different intervals and corresponding numeration. The inch divisions may extend for example from zero to 20 inches, the beginning and end of the scale not reaching one another. The metric scale extends say from zero to 500 mm. again without the ends reaching one another. The intervals in the inch range may be single inches and the intervals in the metric scale in steps of 10 mm. While the scale for millimeter values is on that half of the drum which is adjacent the scale drum 30, the scale for inch values is on the other half, that is, adjacent the scale drum 46. The scale drum 30 is divided in metric measure, one rotation of the drum 30 (fine scale) corresponding to one interval of the metric scale on the drum 39 (coarse scale).

In the example here described the drum 39 is divided in steps of 10 mm. Accordingly the division on the drum 30 is such that 10 mm. extends over the full 360°. The fine scale thus provides fine subdivision of each interval on the coarse scale. The overall transmission ratio of the wheels 21, 24, 25 and 26 is so chosen that with the carrier wheel 27 stationary the scale on the drum 30 indicates exact millimeter values if the machine spindle 23 has a predetermined pitch on the inch system, e.g. a pitch of 0.25 inch.

The scale drum 46 similarly to the drum 30 carries a fine scale. It is divided and numbered, however, in accordance with the inch system. In the present example divisions for one inch extend over 360°. The toothed wheels 40, 41, 44 and 45 serve for driving the drum 46 have an overall ratio which for the present example of a screw spindle of a pitch of 0.25 inch gives one revolution of the drum for four revolutions of the screw spindle, that is, for a feed of one inch. This overall ratio just as for the drum 30 is on the assumption that the corresponding carrier wheel 42 is stationary.

The drive for the drum 39 which carries both coarse scales is effected from the hub of the hand wheel 22 through the carrier 31 of the corresponding epicyclic gear. The overall ratio of the toothed wheels 32, 33, 34 and 35 is so chosen that in the present example the drum 39 for a scale interval of 15° representing one inch, it only rotates through this angle if a screw spindle of a pitch of 0.25 inches, the latter makes four revolutions. It is again assumed that the sun wheel 34, therefore the toothed wheel 36, is prevented from rotating.

In normal operation, each of the three epicyclic gears has one part which is stationary. In the drive of the fine scales 30 and 46 this is the planet carrier while in the drive of the coarse scale 39 this is one of the sun wheels. The holding still of the stationary part is effected by a respective locking device not shown for the wheels 27, 36 and 42. Before the commencement of the machining operation on a machine tool, after releasing the holding device these three wheels can be rotated from the two handknobs 29 and 38. In this way the wheels 28, 37 and 43 are rotated through the shafts 47 and 48. This operation enables all the scales to be brought to zero. Both fine scales 30 and 46 can be brought to zero from the handknob 29 while the coarse scale 39 can be brought to the common zero of both scales on it from the handknob 38. If desired separate handknobs and toothed wheels can be provided for the respective wheels 27, 42 of the two fine scales.

The window 51 already mentioned may be provided with a shutter 52 enabling half of it to be covered. In this way either the pair of scales for the inch system or the pair of scales for the metric system can be covered up thus avoiding risk of error through reference to the wrong scales.

By way of example the following are details of actual dimensions to which the above described embodiments might be made with the corresponding spacing on the scales.

In the first embodiment having one scale each for inches and millimeters, for the inch scale 360° may represent 24 inches. Then 15° represents one inch and the intervals are 14.4 millimeters measured on the periphery of a drum of a diameter of 110 mm. (periphery 346 mm.). 1.5° represents 0.1 inch, the intervals measuring 1.44 mm. on the periphery. On the metric scale with the same diameter drum, 360° may represent 600 mm. in which case 6° represents 10 mm. with an interval breadth of 5.76 mm. and 1.2° represents 2 mm. with an interval breadth of 1.152 mm.

In the second example with a fine and coarse scale for each system and with drums of 110 mm. diameter while the coarse scales may be as in the first example on the fine scale for inch measurements 360° will represent one inch, 3.6° will represent 0.01 inch with an interval breadth of 3.46 mm. and 1.8° will represent 0.005 inch with an interval breadth of 1.73 mm. On the metric fine scale 360° will represent 10 mm. 3.6° will represent 0.1 mm. with an interval breadth of 3.46 mm. and 1.8° will represent 0.05 mm. with an interval breadth of 1.73 mm.

FIGS. 4 to 7 show an embodiment of a device on the lines of that diagrammatically illustrated by FIGS. 2 and 3 and the same references have been used. These figures also illustrate means for holding the stationary members during operation and releasing them for zero adjustment. These consist of brake members 53, 54 and 55 which normally engage the wheels 27, 42 and 36 respectively under spring pressure. The two brakes 53 and 54 can be released by eccentrics 56, 57 for zero adjustment and the brake 55 can be released by an eccentric 58. The eccentrics 56, 57 are carried by a shaft 59 to which is secured a lever 61 held by a overcenter spring 62. In normal braked position the upper end of the lever 61 covers the handknob 29 and the lever must be swung in releasing position of the brakes for access to the knob 29. A similar shaft 63, spring (not shown) and lever 64 cooperating with the brake 55 and handknob 38 are provided.

Alternatively to either of the gear driven coarse indicating scales a longitudinal scale, the divisions of which correspond to the feed represented by one revolution of the respective fine scale may be used as described above.

Figure 8:
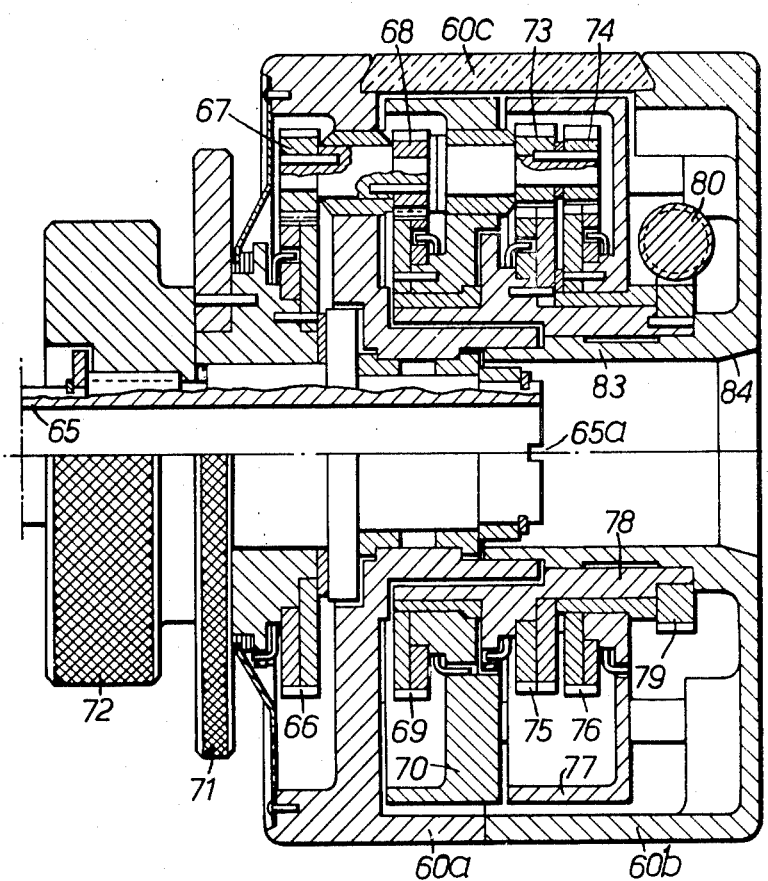
FIG. 8 is a midplane longitudinal section corresponding to that of FIG. 5 of another embodiment.
Figure 9:
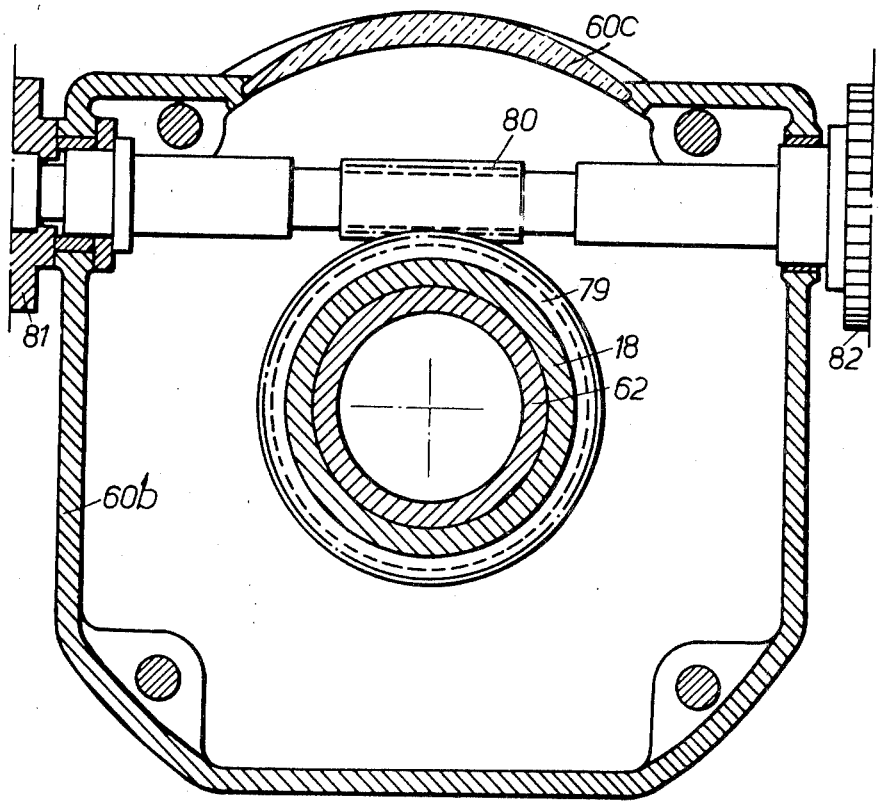
FIG. 9 is a cross section of FIG. 8.
Figure 10:
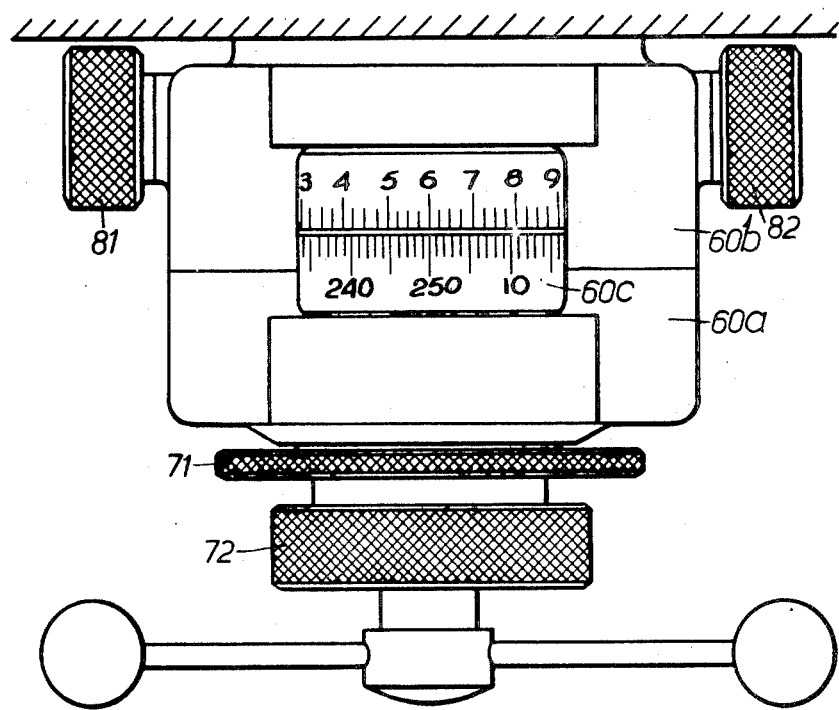
FIG. 10 is a plan view of the embodiment shown in section in FIG. 8.

FIGS. 8, 9 and 10 show an embodiment providing for coarse and fine measurements in a different measuring system from that of the screw.

There is a casing in two parts 60a, 60b securable to the machine frame, with a window 60c. A hollow shaft 65 is couplable to the feed screw by a slot 65a. The shaft 65 is geared by epicyclic gearing comprising sun wheel 66, planet wheels 67 and 68, and sun wheel 69 to a fine measurement scale drum 70 carried by the wheel 69, the gear ratio being chosen to effect the desired conversion e.g. inch to metric or vice versa. For zero adjustment, the wheel 66 can be released by loosening a nut 72 and rotated by a knurled disc 71, the parts then being locked by tightening the nut 72.

Rotation of the drum 70 is conveyed by further epicyclic gearing comprising planet wheels 73, 74, fixed sun wheel 75 and a driven sun wheel 76 carried by a coarse measurement scale drum 77. This layout of the gearing conveniently provides the high ratio necessary for the coarse scale so that one revolution of the latter indicates many complete revolutions of the scale 70.

To provide zero adjustment of the drum 77, the wheel 75 is carried by a bush 78 rotatable by a worm wheel 79 on the bush end and a worm 80 normally locked by a handnut 81. After release of this nut the worm can be rotated by a knob 82 and the nut then be tightened again.

The hollow shaft 65, a sleeve 83 and taper 84 facilitate mounting of the whole as an existing machine.

This embodiment shows the sun wheels made up of a fast part and loose part, the latter being spring loaded, to avoid backlash. Similar arrangements could be used in the other embodiments. If desired also the gear wheels may be helically toothed.

Advantages of the present invention are among others that although epicyclic gearing is used only externally toothed wheels and no internally toothed wheels are used, that many different useful ratios are available with reasonable sizes of gear wheels and without the need for wheel spacings involving correction of tooth forms. The available choice of ratios also makes possible decimal subdivision of both index scales. The disposition of the gearing is compact enabling compact casings and neat constructions readily adaptable to existing machines to be designed.

By way of example in the layout of FIG. 2 with screw of 0.20 inch pitch by giving the wheels 21, 24, 25 and 26 tooth numbers 127, 25, 25, and 250, one revolution of the wheel 26 and therefore of the scale 30 will represent 10 mm. feed. For a screw of 0.25 pitch the same result with the wheels 21, 24, 25 the same as above requires the wheel 26 to have 200 teeth. Since wheels 24, 25 have been chosen of the same number 25 this number can be varied according to convenience. Other possibilities can be calculated in accordance with known principles.

What I claim:

1. Indicating means for indicating feed movements produced by a feed screw having a pitch according to one system of measurement in accordance with another system of measurement related to said one system of measurement by a ratio of two integers, said indicating means comprising a feed screw having a pitch according to one system of measurement, a hand rotated member, means coupling said member to said screw, a first index scale displaceable to indicate feed movement in another system of measurement, a second index scale operatively displaceable by said member to indicate feed movement in said one system of measurement, a common shaft, first differential gear means operatively interconnecting said common shaft, said first index scale and said hand-rotated member, second differential gear means operatively interconnecting said second index scale, said common shaft and said band rotated member, said first and second differential gears each being a planetary gear having a first externally toothed sun wheel fast on said common shaft, planet wheels journaled in a planet carrier normally held stationary, each said planet carrier incorporating a first gear wheel with both said first gear wheels being normally held stationary by respective lockable second gear wheels on the same shaft meshing with said first gear wheels, said second gear wheels when unlocked being rotatable together by accessible manual means whereby a common zero adjustment of both said first and second index scales can be effected, and a second externally toothed sun wheel journaled on said common shaft and carrying a drum constituting the respective first and second index scale, a third index scale, and a third planetary gear connecting said third index scale to said common shaft, said third index scale having divisions according to both said one and said other system of measurement and corresponding to coarser measurement indications than said first and second index scales.

2. Indicating means according to claim 1 including locking means for each said second gear wheel, each said locking means comprising a spring-urged brake, and an eccentric rotatable by a lever to release said brakes, a common lever arranged to rotate both said eccentrics, said lever when said brakes are in action serving to hinder access to said accessible manual means but moving clear of said accessible manual means when said lever is moved to release said brakes.

3. Indicating means according to claim 1 wherein said third planetary gear comprises planet wheels journaled on a planet wheel carrier fast to said shaft, a first sun wheel normally held stationary, and a second sun wheel journaled on said shaft, said third index scale being a drum carried by said second sun wheel.

4. Indicating means according to claim 3 wherein the first sun wheel of said third planetary gear is fast to a gear wheel and is normally held stationary by a lockable additional gear wheel meshing therewith, said additional gear wheel when unlocked being rotatable by accessible manual means whereby a zero adjustment can be effected.

* * * * *